US009871552B2

(12) United States Patent
Din et al.

(10) Patent No.: US 9,871,552 B2
(45) Date of Patent: Jan. 16, 2018

(54) TRANSCEIVER ARRANGEMENT, COMMUNICATION DEVICE, METHOD AND COMPUTER PROGRAM

(71) Applicant: Telefonaktiebolaget L M Ericsson (publ), Stockholm (SE)

(72) Inventors: Imad ud Din, Lund (SE); Stefan Andersson, Flyinge (SE); Daniel Eckerbert, Landskrona (SE); Henrik Sjöland, Lund (SE); Johan Wernehag, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 87 days.

(21) Appl. No.: 14/785,908

(22) PCT Filed: Apr. 30, 2013

(86) PCT No.: PCT/EP2013/058997
§ 371 (c)(1),
(2) Date: Oct. 21, 2015

(87) PCT Pub. No.: WO2014/177191
PCT Pub. Date: Nov. 6, 2014

(65) Prior Publication Data
US 2016/0072542 A1 Mar. 10, 2016

(51) Int. Cl.
H04L 5/14 (2006.01)
H04B 1/40 (2015.01)
(Continued)

(52) U.S. Cl.
CPC ............ *H04B 1/40* (2013.01); *H04B 1/0458* (2013.01); *H04B 1/18* (2013.01); *H04B 1/525* (2013.01); *H04L 5/14* (2013.01); *H04L 5/16* (2013.01)

(58) Field of Classification Search
None
See application file for complete search history.

(56) References Cited

U.S. PATENT DOCUMENTS 404,375 A    6/1869  Bain
3,900,823 A  8/1975  Sokal et al.
(Continued)

FOREIGN PATENT DOCUMENTS

CN    102332931 A    1/2012
EP    0388927 A1     9/1990
(Continued)

OTHER PUBLICATIONS

Pursula, P. et al., "Hybrid Transformer-Based Adaptive RF Front End for UHF RFID Mobile Phone Readers", 2008 IEEE International Conference on RFID, The Venetian, Las Vegas, US, Apr. 16, 2008, pp. 151-155, IEEE.
(Continued)

Primary Examiner — Kodzovi Acolatse
(74) Attorney, Agent, or Firm — Coats & Bennett, PLLC

(57) ABSTRACT

A transceiver arrangement comprises a receiver arranged for frequency-division duplex communication with a communication network; a transmitter arranged for frequency-division duplex communication with the communication network; a transmission port for connecting to an antenna or wire; a first filter connected between an output of the transmitter and the transmission port and arranged to pass signals at transmitter frequency and attenuate signals at receiver frequency; a transformer having a primary winding and a secondary winding, wherein the primary winding has one of its terminals connected to the transmission port; a second filter connected between another of the terminals of the primary winding and a reference voltage and arranged to attenuate signals at transmitter frequency and pass signals at receiver frequency; and an adaptive impedance circuit
(Continued)

arranged to provide an adjustable resistance, connected between the output of the transmitter and the junction between the second filter and the another of the terminals of the primary winding, and arranged to provide a contribution from the transmitter to the primary winding such that a common-mode rejection of a contribution from the transmitter provided at the transmission port occurs at receive frequency. A communication device, a method of controlling a transceiver arrangement, and a computer program are also disclosed.

16 Claims, 5 Drawing Sheets

(51) Int. Cl.
  *H04L 5/16* (2006.01)
  *H04B 1/04* (2006.01)
  *H04B 1/18* (2006.01)
  *H04B 1/525* (2015.01)

(56) References Cited

U.S. PATENT DOCUMENTS

| | | | |
|---|---|---|---|
| 4,325,140 A | 4/1982 | Stitzer | |
| 5,404,375 A | 4/1995 | Kroeger et al. | |
| 6,169,912 B1 | 1/2001 | Zuckerman | |
| 6,567,648 B1 | 5/2003 | Ahn et al. | |
| 6,567,649 B2 | 5/2003 | Souissi | |
| 6,745,018 B1 | 6/2004 | Zehavi et al. | |
| 7,109,793 B2 | 9/2006 | Nakatani et al. | |
| 7,756,480 B2 | 7/2010 | Loh | |
| 8,654,743 B1 | 2/2014 | Li et al. | |
| 8,797,927 B2 | 8/2014 | Chen | |
| 8,909,161 B2 | 12/2014 | Din et al. | |
| 9,143,186 B2 | 9/2015 | Andersson et al. | |
| 9,344,139 B2 | 5/2016 | Sjoland et al. | |
| 2003/0008693 A1 | 1/2003 | Tanaka et al. | |
| 2003/0128081 A1 | 7/2003 | Ella et al. | |
| 2003/0193997 A1* | 10/2003 | Dent | H03F 3/24 375/219 |
| 2004/0180633 A1 | 9/2004 | Nakatani et al. | |
| 2005/0035824 A1 | 2/2005 | Kearns | |
| 2005/0046585 A1 | 3/2005 | Dodge | |
| 2005/0170790 A1 | 8/2005 | Chang et al. | |
| 2006/0028298 A1 | 2/2006 | Nakamura et al. | |
| 2006/0133599 A1 | 6/2006 | Pagnanelli | |
| 2006/0135084 A1 | 6/2006 | Lee | |
| 2006/0261902 A1 | 11/2006 | Masuda et al. | |
| 2007/0015468 A1 | 1/2007 | Kouki et al. | |
| 2007/0117524 A1 | 5/2007 | Do | |
| 2007/0152904 A1 | 7/2007 | Castaneda et al. | |
| 2007/0182509 A1 | 8/2007 | Park et al. | |
| 2007/0202826 A1 | 8/2007 | Dean | |
| 2007/0207747 A1 | 9/2007 | Johnson et al. | |
| 2007/0217488 A1 | 9/2007 | Smaini et al. | |
| 2008/0198773 A1 | 8/2008 | Loh | |
| 2008/0238789 A1 | 10/2008 | Wilcox | |
| 2008/0242235 A1 | 10/2008 | Adler et al. | |
| 2008/0279262 A1 | 11/2008 | Shanjani | |
| 2009/0028074 A1 | 1/2009 | Knox | |
| 2009/0253385 A1 | 10/2009 | Dent et al. | |
| 2009/0289739 A1 | 11/2009 | Sasaki et al. | |
| 2010/0035563 A1 | 2/2010 | Mikhemar et al. | |
| 2010/0109800 A1 | 5/2010 | Ueda et al. | |
| 2010/0148886 A1 | 6/2010 | Inoue et al. | |
| 2010/0159837 A1 | 6/2010 | Dent et al. | |
| 2010/0253477 A1 | 10/2010 | Seppä et al. | |
| 2010/0279617 A1 | 11/2010 | Osman | |
| 2010/0304701 A1 | 12/2010 | Jung et al. | |
| 2011/0064004 A1 | 3/2011 | Mikhemar et al. | |
| 2011/0064005 A1 | 3/2011 | Mikhemar et al. | |
| 2011/0124309 A1 | 5/2011 | Trotta et al. | |
| 2011/0158134 A1 | 6/2011 | Mikhemar et al. | |
| 2011/0175789 A1 | 7/2011 | Lee et al. | |
| 2011/0187478 A1 | 8/2011 | Link et al. | |
| 2011/0199142 A1 | 8/2011 | Mu | |
| 2011/0221521 A1 | 9/2011 | Razzell et al. | |
| 2011/0299433 A1 | 12/2011 | Darabi et al. | |
| 2011/0299437 A1 | 12/2011 | Mikhemar et al. | |
| 2012/0009886 A1 | 1/2012 | Poulin | |
| 2012/0126907 A1 | 5/2012 | Nakamoto et al. | |
| 2012/0195351 A1 | 8/2012 | Banwell et al. | |
| 2013/0063223 A1 | 3/2013 | See et al. | |
| 2013/0077540 A1 | 3/2013 | Black et al. | |
| 2013/0176912 A1 | 7/2013 | Khlat | |
| 2013/0194978 A1 | 8/2013 | Andersson et al. | |
| 2013/0258911 A1* | 10/2013 | Choksi | H03H 7/09 370/277 |
| 2013/0271004 A1 | 10/2013 | Min et al. | |
| 2013/0315116 A1 | 11/2013 | Chen | |
| 2014/0169231 A1 | 6/2014 | Mikhemar et al. | |
| 2014/0169235 A1* | 6/2014 | Mikhemar | H03H 7/463 370/278 |
| 2014/0253236 A1 | 9/2014 | Cheeranthodi et al. | |
| 2014/0315501 A1 | 10/2014 | Rudell et al. | |
| 2014/0364073 A1 | 12/2014 | Sjoland | |
| 2014/0376419 A1 | 12/2014 | Goel et al. | |
| 2015/0156005 A1 | 6/2015 | Sjoland et al. | |
| 2015/0281974 A1 | 10/2015 | Ghasemzadeh et al. | |
| 2015/0303981 A1 | 10/2015 | Sjoland et al. | |
| 2016/0043767 A1 | 2/2016 | Andersson et al. | |
| 2016/0065352 A1 | 3/2016 | Sjoland et al. | |
| 2016/0294436 A1 | 10/2016 | Din et al. | |

FOREIGN PATENT DOCUMENTS

| | | | |
|---|---|---|---|
| EP | 1813030 A1 | 8/2007 | |
| EP | 2226948 A1 | 9/2010 | |
| EP | 2296286 A2 | 3/2011 | |
| EP | 2388927 A2 | 11/2011 | |
| EP | 2672631 A1 | 12/2013 | |
| RU | 2264032 C2 | 11/2005 | |
| WO | 2006068635 A1 | 6/2006 | |
| WO | 2007149954 A1 | 12/2007 | |
| WO | 2009080878 A1 | 7/2009 | |
| WO | 2011146404 A1 | 11/2011 | |
| WO | 2014173459 A1 | 10/2014 | |

OTHER PUBLICATIONS

Mikhemar, M., et al., "A Tunable Integrated Duplexer with 50dB Isolation in 40nm CMOS", IEEE International Solid-State Circuits Conference—Digest of Technical Papers, Feb. 8, 2009, 386-387,387a, San Francisco, CA, IEEE.

Mikhemar, M., et al., "An On-Chip Wideband and Low-Loss Duplexer for 3G/4G CMOS Radios", 2010 IEEE Symposium on VLSI Circuits (VLSIC), Technical Digest of Technical Papers, Jun. 16, 2010, pp. 129-130, IEEE.

Larson, L., et al., "4th Generation Wireless Transceiver Design", Bipolar/BiCMOS Circuits and Technology Meeting (BCTM), Oct. 4, 2010, pp. 113-120, IEEE.

Elzayat, A., et al., "Tx/Rx Isolation Enhancement Based on a Novel Balanced Duplexer Architecture", 2011 IEEE MTT-S International Microwave Symposium Digest, Jun. 5, 2011, pp. 1-4, IEEE.

* cited by examiner

TRANSCEIVER ARRANGEMENT, COMMUNICATION DEVICE, METHOD AND COMPUTER PROGRAM

TECHNICAL FIELD

The present invention generally relates to a transceiver arrangement. The present invention also relates to a communication device capable of frequency division duplex communication comprising such a transceiver arrangement. The present invention also relates to a method of operating such a transceiver arrangement, and a computer program for implementing the method.

BACKGROUND

Transceivers comprise both a transmitter and a receiver, and are commonly used in a variety of communication apparatuses. Transceivers can be arranged to be operated in semi-duplex, i.e. the receiver and transmitter operate separated in time to prevent the transmitter signal from concealing the received signal. This approach is therefore commonly referred to as time division duplex (TDD). Transceivers can also be operated in full duplex, i.e. the receiver and transmitter operate simultaneously wherein some special arrangements are provided to prevent the transmitter from concealing the received signal. One approach to achieve this is to assign different frequencies for transmission and reception. This approach is therefore commonly referred to as frequency division duplex (FDD).

Often the receiver and the transmitter use the same antenna, or antenna system which may comprise several antennas, which implies that some kind of circuitry may be desired to enable proper interaction with the antenna. This circuitry should be made with certain care when operating the transceiver in full duplex since the transmitter signal, although using FDD, may interfere with the received signal, i.e. internal interference within the transceiver. FIG. 1 illustrates an example of a communication apparatus 100 comprising a transceiver 102, an antenna 104 connected to the transceiver 102, and further circuitry 106 such as processing means, input and output circuitry, and memory means. The transceiver 102 comprises a transmitter 108, a receiver 110, and a duplexer 112 which is connected to the transmitter 102, the receiver 110 and the antenna 104. The duplexer 112 is arranged to direct radio frequency (RF) signal from the transmitter to the antenna, as indicated by arrow 114, and from the antenna to the receiver, as indicated by arrow 116, and can for example comprise a circulator. Duplexers are known in the art and for example described in U.S. Pat. No. 4,325,140. Further, duplexers are commonly costly, space consuming and challenging to be implemented on-chip. Therefore, efforts have been made in the art to achieve the similar effects with on-chip solutions. These are commonly based on electrical balance by using a dummy load which is arranged to be equal to the antenna impedance. FIG. 2 illustrates an example of such a structure 200, which is also disclosed in WO 2009/080878 A1, comprising a transmitter 202, a receiver 204, and an antenna 206. The transmitter 202 provides its output signal both to a branch towards the antenna 206, the branch comprising a capacitor 208 and an inductor 210, and to a branch towards a dummy load 212, the branch comprising a capacitor 208' and an inductor 210'. The dummy load 212 is arranged to mimic the impedance of the antenna 206, and by the achieved symmetry, and, when using a differential input to the receiver 204 via a transformer 214, the contribution at the receiver input from the transmitted signal can be suppressed. Such solutions will result in relatively large insertion loss.

SUMMARY

An object of the invention is to at least alleviate the above stated drawback. The present invention is based on the understanding that counteracting contribution from a transmitter at a receiver input in a transceiver reduces or cancels signal. The inventors have found that contribution by the transmitter signal at the receiver input via one branch can be counteracted by the contribution by the transmitter signal at the receiver input via another branch including an element including an adaptable resistance, wherein the aggregate contribution by the transmitter signal at the receiver input is ideally zero. By combining a filtering structure with a cancelling structure, less transmitter energy will reach the receiver.

According to a first aspect, there is provided a transceiver arrangement comprising a receiver arranged for frequency-division duplex communication with a communication network; a transmitter arranged for frequency-division duplex communication with the communication network; a transmission port for connecting to an antenna or wire; a first filter connected between an output of the transmitter and the transmission port and arranged to pass signals at transmitter frequency and attenuate signals at receiver frequency; a transformer having a primary winding and a secondary winding, wherein the primary winding has one of its terminals connected to the transmission port; a second filter connected between another of the terminals of the primary winding and a reference voltage and arranged to attenuate signals at transmitter frequency and pass signals at receiver frequency; and an adaptive impedance circuit arranged to provide an adjustable resistance, connected between the output of the transmitter and the junction between the second filter and the another of the terminals of the primary winding, and arranged to provide a contribution from the transmitter to the primary winding such that a common-mode rejection of a contribution from the transmitter provided at the transmission port occurs at receive frequency.

The transceiver arrangement may further comprise a third filter connected between the output of the transmitter and a reference voltage and arranged to attenuate signals at transmitter frequency and pass signals at an interferer frequency.

The transceiver arrangement may further comprise a fourth filter connected at the input of the receiver arranged to attenuate signals at receive frequency and pass signals at an interferer frequency. The fourth filter may be connected across differential input terminals of the receiver, or the fourth filter may be connected between a single-ended input terminal of the receiver and a reference voltage.

The first filter may comprise a capacitance and a first inductance coupled in parallel where the parallel coupling is coupled in series with a second inductance, and the second filter comprises a first capacitance and an inductance coupled in parallel, where the parallel coupling is coupled in series with a second capacitance. At least one of the capacitance and the first and second inductances of the first filter may be controllable and is controlled by a controller, and at least one of the inductance and the first and second capacitances of the second filter is controllable and is controlled by the controller. The first filter may comprise a further capacitance coupled in series with the second inductance, and the further capacitance may be controllable and controlled by the controller.

The first filter may comprise a first capacitance and an inductance coupled in parallel, where the parallel coupling is coupled in series with a second capacitance, and the second filter comprises a capacitance and a first inductance coupled in parallel where the parallel coupling is coupled in series with a second inductance. At least one of the inductance and the first and second capacitances of the first filter may be controllable and controlled by a controller, and at least one of the capacitance and the first and second inductances of the second filter may be controllable and controlled by the controller. The second filter may comprise a further capacitance coupled in series with the second inductance, and the further capacitance may be controllable and controlled by the controller.

The transceiver arrangement may further comprise a signal detector arrangement at terminal or terminals of an input port of the receiver or at the terminals of the primary winding, and a controller arranged to control at least one of the first filter, the second filter and the adaptive impedance circuit based on the detected signal or signals such that the transmitter contribution at the receiver input at receive frequency is minimised.

According to a second aspect, there is provided a communication device, capable of frequency division duplex communication via a communication network, comprising a transceiver arrangement according to the first aspect.

According to a third aspect, there is provided a method of controlling a transceiver arrangement comprising a receiver and a transmitter arranged for frequency-division duplex communication with a communication network, a transmission port for connecting to an antenna or wire, a first filter connected between an output of the transmitter and the transmission port and arranged to pass signals at transmitter frequency and attenuate signals at receiver frequency, a transformer having a primary winding and a secondary winding, wherein the primary winding has one of its terminals connected to the transmission port, a second filter connected between another of the terminals of the primary winding and a reference voltage and arranged to attenuate signals at transmitter frequency and pass signals at receiver frequency, and an adaptive impedance circuit arranged to provide an adjustable resistance, connected between the output of the transmitter and the junction between the second filter and the another of the terminals of the primary winding, and arranged to provide a contribution from the transmitter to the primary winding such that a common-mode rejection of a contribution from the transmitter provided at the transmission port occurs at receive frequency. The method comprises setting filter parameters such that the first filter passes signals at transmitter frequency and attenuates signals at receiver frequency and the second filter attenuates signals at transmitter frequency and passes signals at receive frequency; adjusting the adjustable resistance of the adaptive impedance circuit such that magnitude of transmitter contribution in the primary winding is reduced; and phase tuning at least one impedance element of at least one of the first filter, the second filter and the adaptive impedance circuit such that the amplitude is minimised.

The method may further comprise measuring signals at the receiver input or at the primary winding of the transformer, wherein the adjusting of the adjustable resistance and/or the phase tuning is based on the measured signals.

According to a fourth aspect, there is provided a computer program comprising computer executable instructions which when executed by a programmable controller of a transceiver arrangement causes the controller to perform the method according to the third aspect.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc)" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Figure 1:
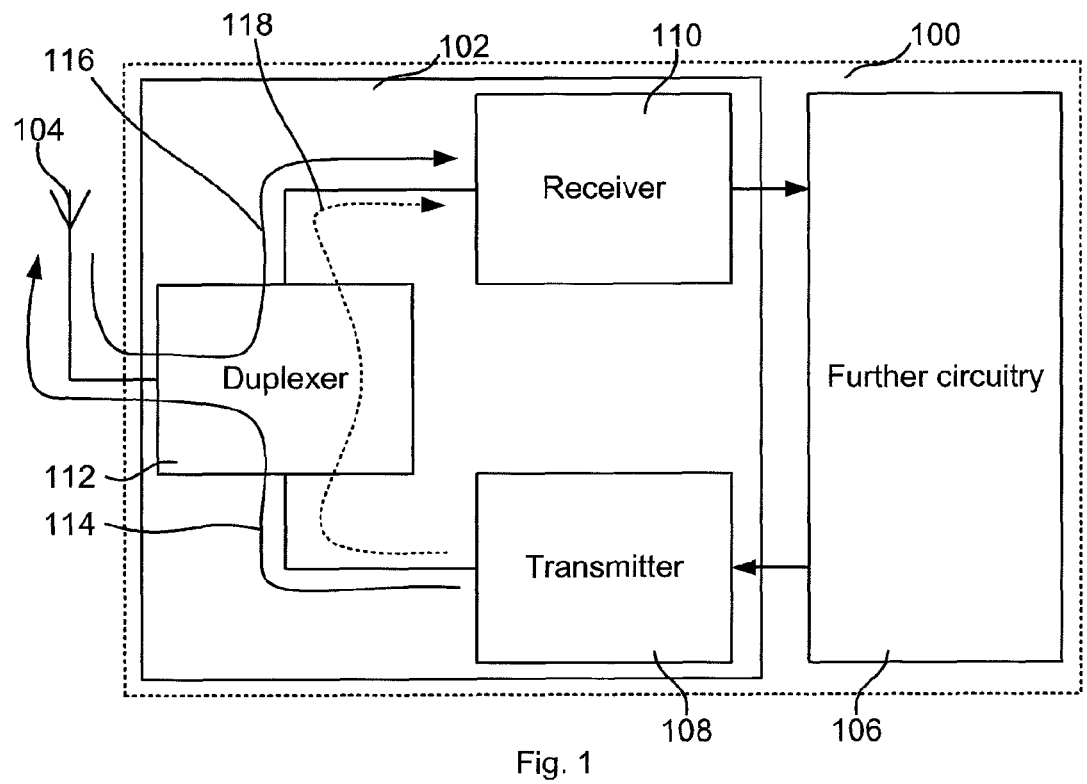
FIG. 1 is a block diagram which schematically illustrates a conventional communication apparatus comprising a transceiver.
Figure 2:
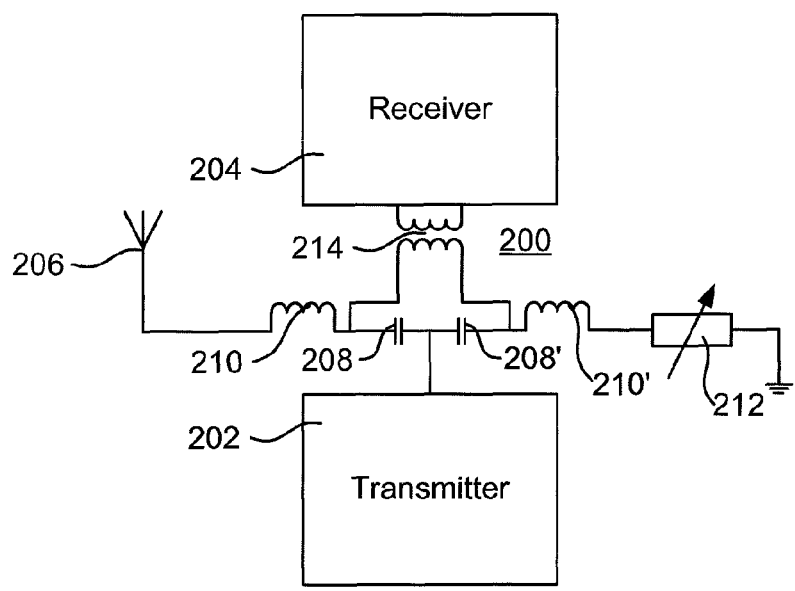
FIG. 2 is a schematic circuit diagram which illustrates an FDD transceiver arrangement with a duplexer based on electrical balance.
Figure 3:
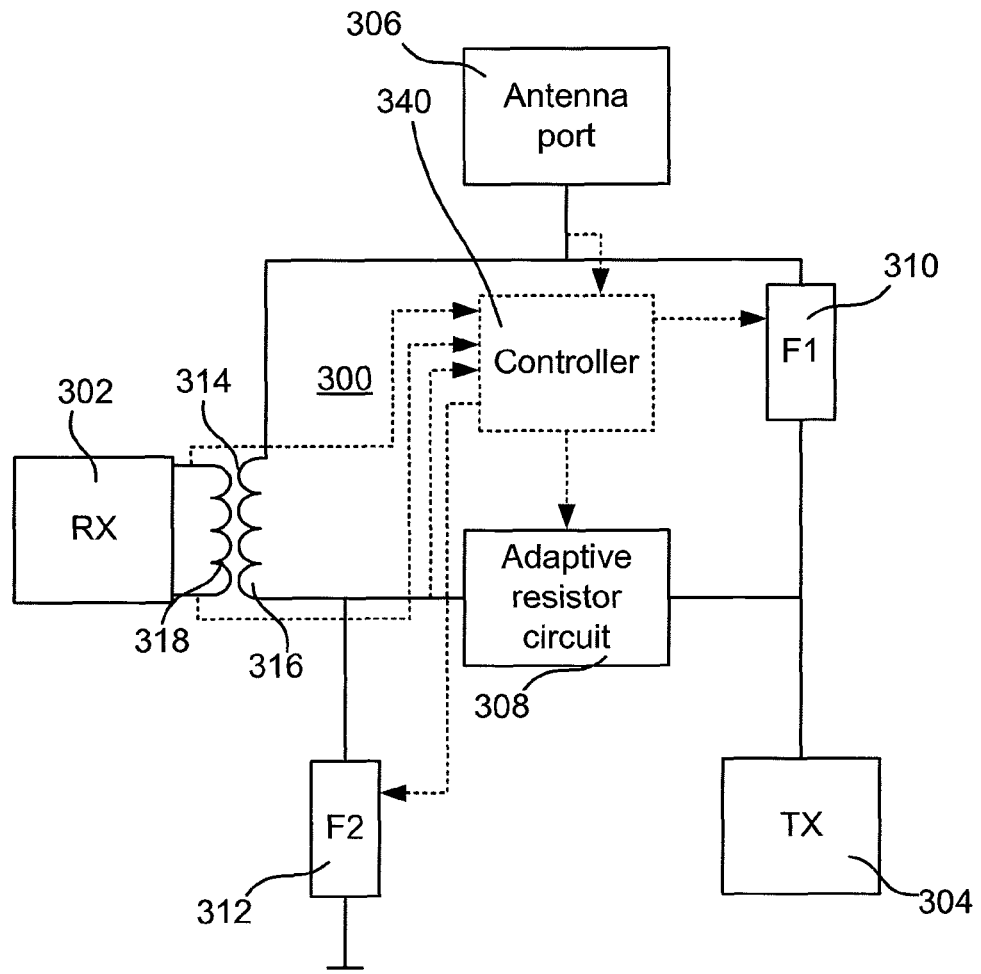
FIG. 3 is a block diagram which schematically illustrates a transceiver arrangement according to an embodiment.

FIG. 3 is a block diagram which schematically illustrates a transceiver arrangement 300 according to an embodiment. The transceiver arrangement comprises a receiver 302 arranged for frequency-division duplex communication with a wireless or wired communication network, a transmitter 304 arranged for frequency-division duplex, FDD, communication with the wireless or wired communication network, an antenna port 306 for connecting to an antenna. By combining a filtering structure comprising a first filter 310 and a second filter 312 with a cancelling structure, less transmitter energy will reach the receiver. The transceiver arrangement comprises an adaptive impedance circuit 308 arranged to provide an adjustable resistance arranged to provide a sufficiently low contribution from the transmitter 304 at the input of the receiver 302. The adaptive impedance circuit 308 is used to bleed some transmitter signal and pass it through the second filter 312 in order to create a voltage similar to the voltage at the other end of a primary winding 316 at a transformer 314, as will be demonstrated below, in magnitude and phase. Herein, the term "antenna port" is used for easier understanding and is evident for the example of a wireless transceiver. The term can be substituted by for example the term "cable connection" to provide easier understanding of how the transceivers disclosed herein can be used for wired operation in all the herein given examples.

A general term can be "transmission port", which should apply for both wired and wireless operation.

The transmitting frequency and the receiving frequencies are distinguished since the transceiver arrangement 300 is arranged to work with FDD communication. The first filter 310 is of a type which is arranged to pass signals at the transmitting frequency and attenuate signals at the receive frequency. Thus, a signal at transmitting frequency from the transmitter 304 will be transmitted efficiently through e.g. an antenna connected to the antenna port 306.

The second filter 312 is of a type which are arranged to pass signals at the receiving frequency and attenuate signals at the transmitting frequency. Thus, a signal at transmitting frequency from the transmitter 304 will not be lost to ground and is enabled to be transmitted efficiently through e.g. an antenna connected to the antenna port 306.

A received signal from an antenna connected to the antenna port 306 reaches the receiver 302 via a transformer 314 which has a primary winding 316 which is connected via the second filter to a reference voltage, e.g. ground. A secondary winding 318 of the transformer 314 is connected to the input of the receiver 302. Thus, the transceiver arrangement 300 provides a structure which efficiently provides signals from the transmitter to the antenna port, efficiently provides signals from the antenna port to the receiver, and at the same time reduces interfering signals from the transmitter to reach the receiver.

The second filter 312 has high impedance at transmit frequency and the adaptive impedance circuit 308 bleeds some transmitter output current to this high impedance such that the resulting signal gets the same amplitude as the transmitter signal at the other terminal of the primary winding 316, i.e. at the antenna port node. Thus, the adaptive impedance circuit 308 is tuned for magnitude cancellation of the transmitter signal at the receiver. The first filter limits the amount of transmitter noise at receive frequency to get through to the receiver by providing a high impedance at the receive frequency. The high impedance at the receive frequency also reduces receiver insertion loss.

Symmetry of the transmitter signal reaching one terminal of the primary winding 316 and the transmitter signal reaching the other terminal of the primary winding 316 via the adaptive impedance circuit 308 is desired to keep the aggregate contribution by the transmitter signal at the receiver input close to zero, i.e. cancellation will then occur in the primary winding 314. This is accomplished adapting the resistance of the adaptive impedance circuit 308. This can be made by having a controller 340 controlling an adjustable resistance of the adaptive impedance circuit 308. Here, although the controller 340 is depicted as a separate element, it can be integrated with the adaptive impedance circuit 308.

The controller 340 can comprise circuitry measuring transmitter contribution signal at the input of the receiver 302, as indicated by hashed lines, or at the terminals of the primary winding 316, and provide control to the . . . adaptive impedance circuit 308 using a control scheme where the transmitter signal contribution at the receiver input is minimised at all times.

The controller 340 can also be arranged to control the filters 310, 312, such that suitable filter characteristics for passing and attenuating signals as described above are achieved for different frequency constellations of frequencies for transmitting and receiving. For example, if the transceiver operates in FDD where transmit frequency is a certain amount higher than the receive frequency, and the transceiver switches to an operation mode where transceiver operates in FDD where receive frequency is the certain amount higher than the transmit frequency, the controller 340 can swap the properties of the first and second filters. Similar change of respective properties of the first and second filters can be made by the controller 340 upon change of the certain amount of frequency difference between receive and transmit frequencies, etc.

Impedance levels of the adaptive impedance circuit 308, the first filter and the second filter are designed and scaled to enable that noise at receive frequency, i.e. contributed by the transmitter, appear as common-mode around the primary winding 316. Such noise is thereby rejected.

Figure 4:
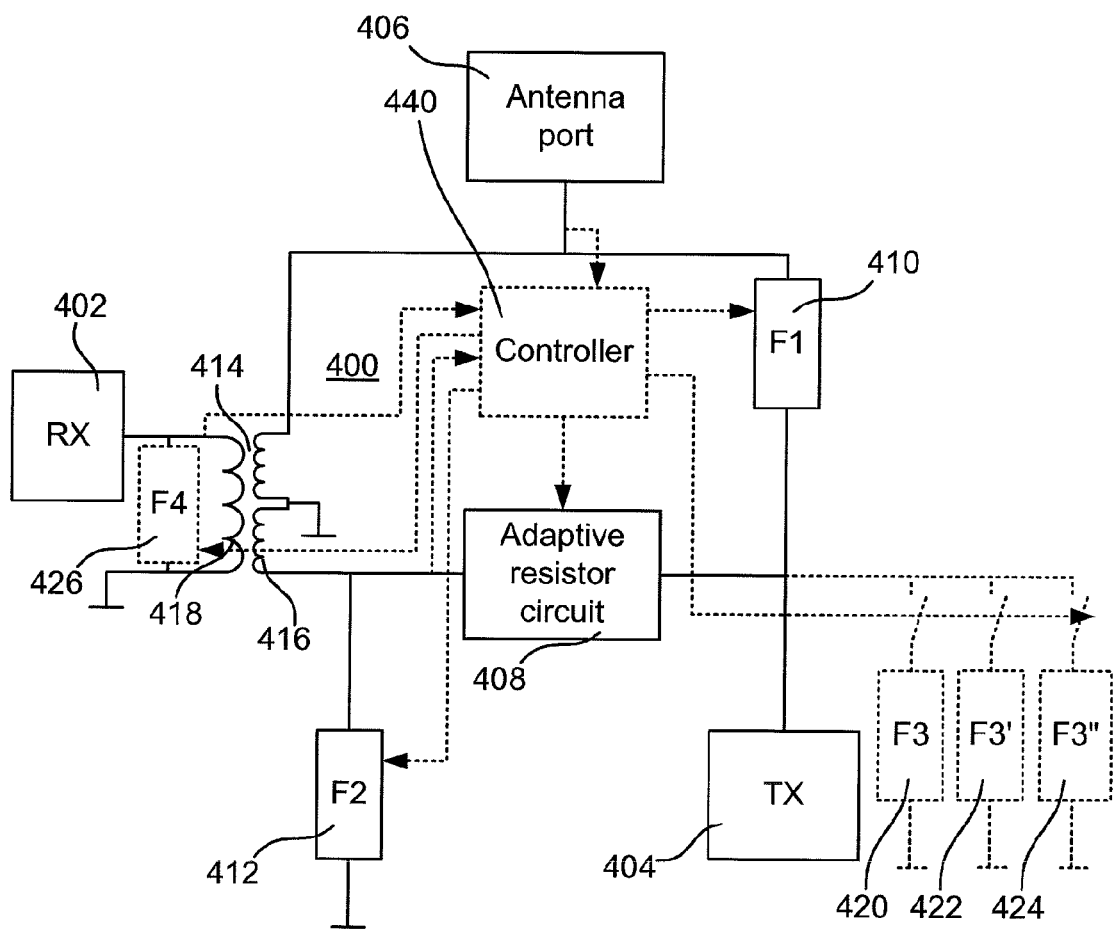
FIG. 4 is a block diagram which schematically illustrates a transceiver arrangement according to an embodiment.

FIG. 4 is a block diagram which schematically illustrates a transceiver arrangement 400 according to an embodiment. The transceiver comprises a receiver, a transmitter 404, an antenna port 406, an adaptive impedance circuit 408, a first filter 410 and a second filter 412 similar to the structure demonstrated with reference to FIG. 3, wherein the first filter 410 is of a type which is arranged to pass signal at transmitting frequency, i.e. the frequency at which the transmitter 404 transmits, and are arranged to attenuate signals at receiving frequency, i.e. the frequency at which the receiver 402 receives desired signals, and the second filter 412 is of a type which is arranged to pass signals at the receiving frequency and attenuate signals at the transmitting frequency. Also similar to the structure demonstrated with reference to FIG. 3, the transceiver arrangement 400 comprises a transformer 414 with a primary winding 416 and a secondary winding and arranged to provide a received signal from an antenna connected to the antenna port 406 to the receiver 402.

A controller 440 can comprise circuitry measuring transmitter contribution signal at the input of the receiver 402, and provide control to the adaptive impedance circuit 408 using a control scheme where the transmitter signal contribution at the receiver input is minimised at all times. The controller 440 can also be arranged to control the filters 410, 412, 414, 416 such that suitable filter characteristics for passing and attenuating signals as described above are achieved for different frequency constellations of frequencies for transmitting and receiving.

The particular features of the structure of FIG. 4 compared to the structure of FIG. 3 are that optional noise filtering of interference, e.g. from a neighbouring frequency band, is provided. This is accomplished by one or more, eventually selectably activated, third filters 420 (and further "third" filters 422, 424) connected between a node where the transmitter 404, the first filter 410, and the adaptive impedance circuit 408 are interconnected and a reference voltage, e.g. ground. Consider for example that the transceiver arrangement 400 is arranged to operate in a frequency band for cellular communication, and interferers are present e.g. on neighbouring bands that are used for example for wireless local area networks such as WiFi, close range radio communication such as Bluetooth, or positioning signalling such as GPS, where the one or more filters 420, 422, 424, respectively, are selected to be activated e.g. by switches as depicted in FIG. 4, or by setting respective filter into a high-impedance state when deactivated. Performance can then be gained when interference is determined or expected to be present, while receiver and/or transmitter insertion loss can be reduced by deactivating one or more filters 420, 422, 424 when interference is determined not to be substantial or not expected to be.

Another option demonstrated with reference to FIG. 4 is a fourth filter which can be selectably activated and is arranged at the input of the receiver 420, i.e. at the secondary winding 418. This filter can be arranged to further reduce contributions from the transmitter 404 and/or other interferers, such as for example a WiFi signal. Also here can performance then be gained when interference is determined or expected to be present, while receiver and/or transmitter insertion loss can be reduced by deactivating the filter 426 when interference is determined not to be substantial or not expected to be. Deactivation can be made by switch(es) (not shown) or by setting the filter 426 to a high-impedance state.

The selectable operation of the optional filters 420, 422, 424, 426 can be controlled by the controller 440.

The receiver 302 depicted in FIG. 3 is shown to be connected differentially to the secondary winding 318 and the receiver 402 depicted in FIG. 4 is shown to be connected single-ended to the secondary winding 418. However, it is equally feasible with a single-ended receiver 302 connected to the secondary winding 318 or a differentially connected receiver 402 connected to the secondary winding 418. The transformer 314, 414 can thus be considered also working as a balun in such cases.

Figure 5:
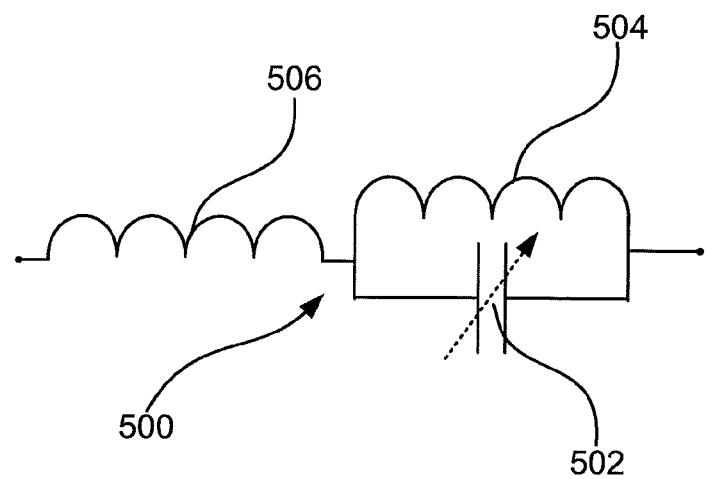
FIG. 5 illustrates a filter according to an embodiment.

The filters in the different embodiments demonstrated above can be made more or less complex, and with different constraints on performance. Simple filters comprising single capacitors or inductors may be used, but may not fulfil the demands of constraints set up. High-order filters may on the other hand introduce other problems, and/or cost/space issues. FIG. 5 illustrates a filter 500 according to an embodiment, which provides dual resonance properties where high impedance is provided at one frequency and low impedance is provided at another frequency, that has been found a reasonable compromise for at least some of the embodiments. It comprises an inductance 504 coupled in parallel with a capacitance 502, wherein the parallel coupling 502, 504 is coupled in series with an inductance 506 between the input and output of the filter 500. It provides a parallel resonance, attenuating the signal at a frequency below a series resonance where the signal is passed.

Figure 6:
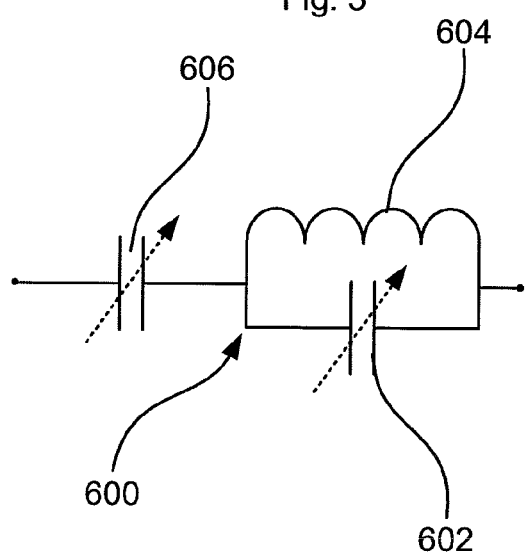
FIG. 6 illustrates a filter according to an embodiment.

FIG. 6 illustrates a filter 600 according to an embodiment, which corresponds to the filter demonstrated with reference to FIG. 5, but with the difference that the parallel coupling 602, 604 is coupled in series with a capacitance 606 between the input and output of the filter 600, and that it provides a series resonance frequency below the parallel resonance frequency.

Depending on whether receiving frequency is higher or lower than the transmitting frequency, the first filter can be selected as one of the types illustrated in FIG. 5 or 6, and the second filter are then selected as the other one of the types illustrated in FIG. 5 or 6.

The impedances of the filters are low at the pass frequency, which is set by the series resonance between their LC tank and the series capacitor or inductor 506, 606. At the rejected frequency the impedance is high, which is set by the parallel resonance of the respective parallel coupling 502, 504; 602, 604. Depending on the frequency relationship between pass and rejection frequency selection between the types of filters 500, 600 is made, i.e. if pass frequency is less than rejected frequency, a filter as depicted in FIG. 6 is selected, and if pass frequency is larger than rejected frequency, a filter as depicted in FIG. 5 is selected.

The capacitors can be coarse and/or fine tuned. Coarse tuning can be used for example to set an operating band of a transceiver arrangement, and fine tuning can be used for phase control for antenna impedance matching. The fine tuning is also applied to achieve proper isolation of the transmitter contribution from the receiver input. Depending on quality factor and value needed for the components in the filters, they can be implemented on chip, on high-Q substrate or as discrete components of a printed circuit board.

Figure 7:
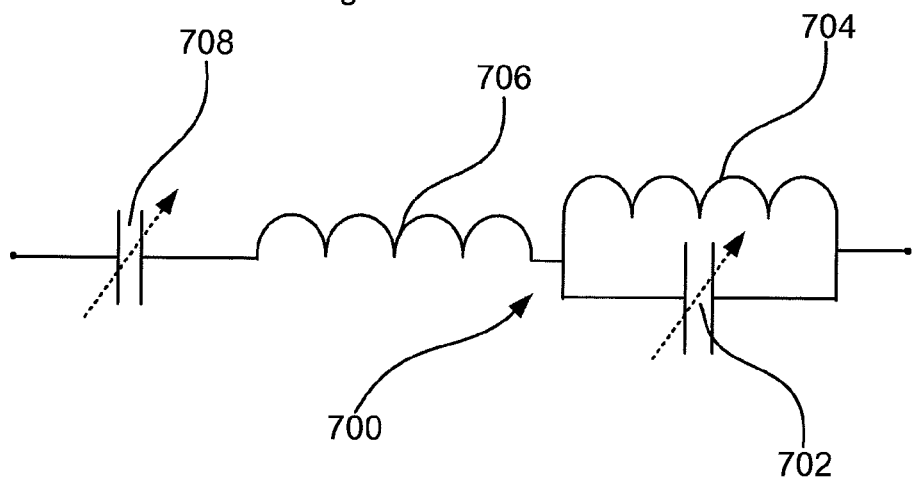
FIG. 7 illustrates a filter according to an embodiment.

FIG. 7 illustrates a filter 700 according to an embodiment, which resembles the filter of FIG. 5 but where an additional capacitor 708 is used in series with the series inductor 706 such that a notch frequency is controllable without having an adjustable inductor. Thus, the filter 700 comprises an inductance 704 coupled in parallel with a capacitance 702, wherein the parallel coupling 702, 704 is coupled in series with the inductance 706 and also in series with the additional capacitor 708 between the input and output of the filter 700.

For the controlling of filter properties as demonstrated above, an efficient way is to let the controller 340, 440 control the capacitance values of capacitances 502, 602, 606, 702, 708 of the filters, e.g. by having the capacitances 502, 602, 606, 702, 708 as controllable capacitance banks. It is of course also possible to control inductors 506, 504, 604, 704, 706.

Figure 8:
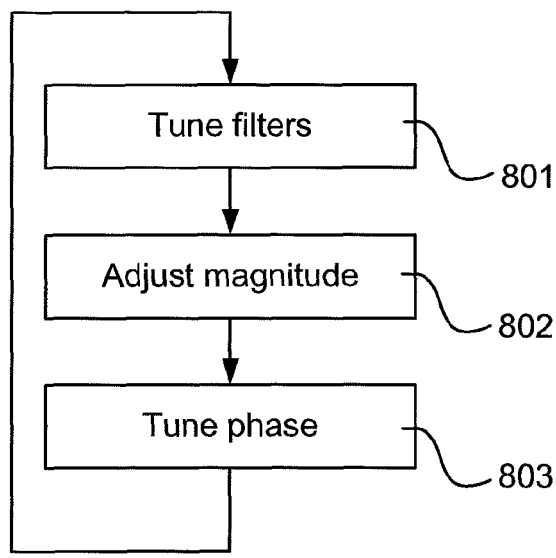
FIG. 8 is a flow chart which schematically illustrates a method according to embodiments.

FIG. 8 is a flow chart which schematically illustrates a method according to embodiments for controlling the filtering structure and cancellation structure. The first filter and the second filter are tuned 801 to the corresponding receive and transmitting frequencies, i.e. such that pass and stop frequencies are set as discussed above. This can be made in different ways. According to one example it is done by tuning the parallel resonance LC tanks 502, 504; 602, 604; 702, 704 by adjusting their respective capacitor 502, 602, 702 (and/or inductor 504, 604, 704), and then tuning series capacitor 606, 708 (and/or inductor 506, 706). Another example is assignment of settings for the first and second filters, e.g. based on a look-up table giving settings for actual receive and transmitting frequencies. Magnitude of bleeding transmitter signal is then adjusted 802, for achieving minimised transmitter contribution in the primary winding as demonstrated above, by adjusting resistance of the adaptive impedance circuit. This can be made based on measurements of amplitude made at input of the receiver or at terminals of the primary winding (i.e. antenna port node and output of the adaptive impedance circuit node). The phase of the bleeding signal is then phase tuned 803. This can be made based on determination of measurements of signals made at input of the receiver or at terminals of the primary winding (i.e. antenna port node and output of the adaptive impedance circuit node). The phase tuning can be made by fine adjustment of the first and/or the second filter, e.g. by fine tuning the LC tanks. The phase tuning can also include tuning of e.g. a capacitor or other impedance element or elements included in the adaptive impedance circuit. The phase tuning can thus include adjusting one or more impedance elements of one or both the filters. This can be combined with tuning impedance element or elements of the adaptive impedance circuit. The method is preferably performed for example at change of receive and/or transmitting frequencies. The control according to the method can also be operating continuously, considering the adaption of the resistance of the adaptive impedance circuit and phase tuning, since impedance at antenna port can change over time, e.g. due to antenna environment. Continuously should in this context not be interpreted as an opposite to time-discrete since the control mechanism can be both a clocked process or a time-continuous process, but should be construed as the adaptation of the impedance of the adaptive impedance circuit is updated over time and/or fine tuning of one or both of the filters to follow any impedance change at the antenna port. For example, retuning for change of antenna port impedance can either be made at regular intervals or when a measurement circuit detects a change in operation environment, e.g. antenna impedance.

Figure 9:
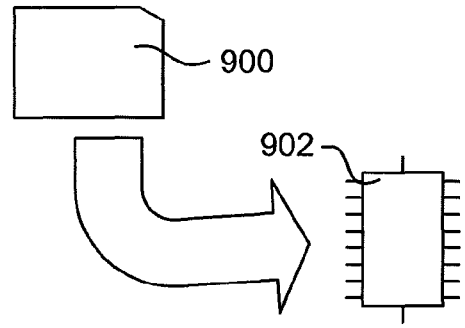
FIG. 9 schematically illustrates a computer program and a processor.

FIG. 9 schematically illustrates a computer program and a processor. The method according to the present invention is suitable for implementation with aid of processing means, such as computers and/or processors, especially for the case where the controller of the adaptive impedance circuit is implemented as processor or programmable circuit. Therefore, there is provided computer programs, comprising instructions arranged to cause the processing means, processor, or computer to perform the steps of any of the methods according to any of the embodiments described with reference to FIG. 8. The computer programs preferably comprises program code which is stored on a computer readable medium 900, as illustrated in FIG. 9, which can be loaded and executed by a processing means, processor, or computer 902 to cause it to perform the methods, respectively, according to embodiments of the present invention, preferably as any of the embodiments described with reference to FIG. 8. The computer 902 and computer program product 900 can be arranged to execute the program code sequentially where actions of the any of the methods are performed stepwise. The processing means, processor, or computer 902 is preferably what normally is referred to as an embedded system. Thus, the depicted computer readable medium 900 and computer 902 in FIG. 9 should be construed to be for illustrative purposes only to provide understanding of the principle, and not to be construed as any direct illustration of the elements.

Figure 10:
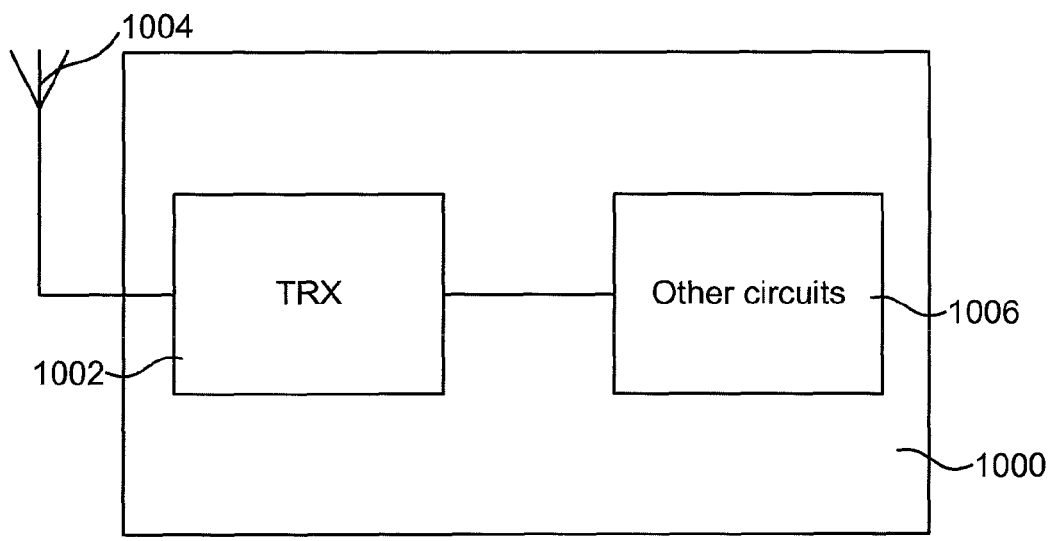
FIG. 10 is a block diagram schematically illustrating a communication device.

FIG. 10 is a block diagram schematically illustrating a communication device 1000. The communication device 1000 is capable of frequency division duplex communication via a communication network. The communication device 1000 comprises a transceiver arrangement 1002 according to any of the above demonstrated. The transceiver arrangement 1002 is connected to an antenna 1004 through its antenna port. The communication device can also comprise other circuits 1006, such as interface towards a user and/or other circuitry or machines, memory, processor, etc. The communication device 1000 can be a smartphone or cellphone, a communication card or device in or for a computer, an embedded communication device in a machine, or the like. The communication device 1000 can be adapted for cellular communication, point-to-point communication, or for communication in a wireless or wired network.

The antenna port described above need not necessarily by connected to an antenna, but can equally be connected to a wired line which conveys radio frequency signals. Thus, the communication device 1000 described with reference to FIG. 10 need not comprise the antenna 1004 wherein the communication device is instead connected to such a wired line conveying radio frequency signals.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:
1. A transceiver arrangement, comprising:
a receiver configured for frequency-division duplex communication with a communication network;
a transmitter configured for frequency-division duplex communication with the communication network;
a transmission port for connecting to an antenna or wire;
a first filter connected between an output of the transmitter and the transmission port, the first filter configured to pass signals at a transmitter frequency and attenuate signals at a receiver frequency;
a transformer having a primary winding and a secondary winding, wherein the primary winding has one of its terminals connected to the transmission port;
a second filter connected between another of the terminals of the primary winding and a reference voltage, the second filter configured to attenuate signals at the transmitter frequency and pass signals at the receiver frequency;
an adaptive impedance circuit configured to provide an adjustable resistance, the adaptive impedance circuit connected between the output of the transmitter and a junction between the second filter and the another of the terminals of the primary winding, the adaptive impedance circuit configured to provide a contribution from the transmitter to the primary winding such that a common-mode rejection of a contribution from the transmitter provided at the transmission port occurs at the receive frequency.

2. The transceiver arrangement of claim 1, further comprising a third filter connected between the output of the transmitter and a reference voltage, the third filter configured to attenuate signals at the transmitter frequency and pass signals at an interferer frequency.

3. The transceiver arrangement of claim 1, further comprising a fourth filter connected at the input of the receiver, the fourth filter configured to attenuate signals at the receive frequency and pass signals at an interferer frequency.

4. The transceiver arrangement of claim 3, wherein the fourth filter is connected across differential input terminals of the receiver.

5. The transceiver arrangement of claim 3, wherein the fourth filter is connected between a single-ended input terminal of the receiver and a reference voltage.

6. The transceiver arrangement of claim 1:
wherein the first filter comprises a capacitance and a first inductance coupled in parallel, wherein the parallel coupling of the first filter is coupled in series with a second inductance;
wherein the second filter comprises a first capacitance and an inductance coupled in parallel, wherein the parallel coupling of the second filter is coupled in series with a second capacitance.

7. The transceiver arrangement of claim 6:
wherein at least one of the capacitance and the first and second inductances of the first filter is controllable and is controlled by a controller;
wherein at least one of the inductance and the first and second capacitances of the second filter is controllable and is controlled by the controller.

8. The transceiver arrangement of claim 7, wherein the first filter comprises a further capacitance coupled in series with the second inductance, and the further capacitance is controllable and is controlled by the controller.

9. The transceiver arrangement of claim 8:
wherein at least one of the inductance and the first and second capacitances of the first filter is controllable and is controlled by a controller;
wherein at least one of the capacitance and the first and second inductances of the second filter is controllable and is controlled by the controller.

10. The transceiver arrangement of claim 9, wherein the second filter comprises a further capacitance coupled in series with the second inductance, and the further capacitance is controllable and is controlled by the controller.

11. The transceiver arrangement of claim 1:
wherein the first filter comprises a first capacitance and an inductance coupled in parallel, wherein the parallel coupling of the first filter is coupled in series with a second capacitance;
wherein the second filter comprises a capacitance and a first inductance coupled in parallel, wherein the parallel coupling of the second filter is coupled in series with a second inductance.

12. The transceiver arrangement of claim 1:
further comprising a signal detector arrangement at a terminal or terminals of an input port of the receiver or at the terminals of the primary winding;
further comprising a controller configured to control at least one of the first filter, the second filter, and the adaptive impedance circuit based on detected signal or signals from the signal detector such that the transmitter contribution at the receiver input at receive frequency is minimized.

13. A communication device, capable of frequency division duplex communication via a communication network, comprising:
a transceiver arrangement;
wherein the transceiver arrangement comprises:
a receiver configured for frequency-division duplex communication with the communication network;
a transmitter configured for frequency-division duplex communication with the communication network;
a transmission port for connecting to an antenna or wire;
a first filter connected between an output of the transmitter and the transmission port, the first filter configured to pass signals at a transmitter frequency and attenuate signals at a receiver frequency;
a transformer having a primary winding and a secondary winding, wherein the primary winding has one of its terminals connected to the transmission port;
a second filter connected between another of the terminals of the primary winding and a reference voltage, the second filter configured to attenuate signals at the transmitter frequency and pass signals at the receiver frequency;
an adaptive impedance circuit configured to provide an adjustable resistance, the adaptive impedance circuit connected between the output of the transmitter and a junction between the second filter and the another of the terminals of the primary winding, the adaptive impedance circuit configured to provide a contribution from the transmitter to the primary winding such that a common-mode rejection of a contribution from the transmitter provided at the transmission port occurs at the receive frequency.

14. A method of controlling a transceiver arrangement; the transceiver arrangement comprising a receiver and a transmitter configured for frequency-division duplex communication with a communication network, a transmission port for connecting to an antenna or wire, a first filter connected between an output of the transmitter and the transmission port, the first filter configured to pass signals at a transmitter frequency and attenuate signals at a receiver frequency, a transformer having a primary winding and a secondary winding, wherein the primary winding has one of its terminals connected to the transmission port, a second filter connected between another of the terminals of the primary winding and a reference voltage, the second filter configured to attenuate signals at the transmitter frequency and pass signals at the receiver frequency, and an adaptive impedance circuit configured to provide an adjustable resistance, the adaptive impedance circuit connected between the output of the transmitter and a junction between the second filter and the another of the terminals of the primary winding, the adaptive impedance circuit configured to provide a contribution from the transmitter to the primary winding such that a common-mode rejection of a contribution from the transmitter provided at the transmission port occurs at receive frequency; wherein the method comprises:
setting filter parameters such that:
the first filter passes signals at the transmitter frequency and attenuates signals at the receiver frequency; and
the second filter attenuates signals at the transmitter frequency and passes signals at the receive frequency;
adjusting the adjustable resistance of the adaptive impedance circuit such that magnitude of transmitter contribution in the primary winding is reduced; and
phase tuning at least one impedance element of at least one of the first filter, the second filter, and the adaptive impedance circuit, such that an amplitude is minimized.

15. The method of claim 14:
further comprising measuring signals at the receiver input or at the primary winding of the transformer;
wherein at least one of the following is based on the measured signals:
the adjusting of the adjustable resistance;
the phase tuning.

16. A computer program product stored in a non-transitory computer readable medium for controlling a transceiver arrangement; the transceiver arrangement comprising a receiver and a transmitter configured for frequency-division duplex communication with a communication network, a transmission port for connecting to an antenna or wire, a first filter connected between an output of the transmitter and the transmission port, the first filter configured to pass signals at a transmitter frequency and attenuate signals at a receiver frequency, a transformer having a primary winding and a secondary winding, wherein the primary winding has one of its terminals connected to the transmission port, a second filter connected between another of the terminals of the primary winding and a reference voltage, the second filter configured to attenuate signals at the transmitter frequency and pass signals at the receiver frequency, and an adaptive impedance circuit configured to provide an adjustable resistance, the adaptive impedance circuit connected between the output of the transmitter and a junction between the second filter and the another of the terminals of the primary winding, the adaptive impedance circuit configured to provide a contribution from the transmitter to the primary winding such that a common-mode rejection of a contribution from the transmitter provided at the transmission port occurs at receive frequency; the computer program product comprising software instructions which, when run on a processing circuit of the a processing circuit of a transceiver arrangement, causes the processing circuit to:
set filter parameters such that:
the first filter passes signals at the transmitter frequency and attenuates signals at the receiver frequency; and
the second filter attenuates signals at the transmitter frequency and passes signals at the receive frequency;
adjust the adjustable resistance of the adaptive impedance circuit such that magnitude of transmitter contribution in the primary winding is reduced; and phase tune at least one impedance element of at least one of the first filter, the second filter, and the adaptive impedance circuit, such that an amplitude is minimized.

* * * * *